UNITED STATES PATENT OFFICE 2,603,617

PLASTICIZING NATURAL AND SYNTHETIC ELASTOMERS BY INCORPORATION OF N-ISOPROPYL THIOSALICYLAMIDE

Edwin O. Hook, Old Greenwich, Conn., and Elmer W. Cook, New York, N. Y., assignors to American Cyanamid Company, New York, N. Y., a corporation of Maine No Drawing. Application August 30, 1946, Serial No. 694,163

3 Claims. (Cl. 260—30.8)

This invention relates to a new plasticizer for elastomeric compositions, to methods of plasticizing elastomer compositions and to compositions so produced.

One such procedure is the plasticizing of rubber or synthetic rubbers by the action of hot air or oxygen under suitable conditions. Others are based on the fact that small amounts of chemicals, for example some of the aromatic mercaptans and certain nitroso compounds, can be utilized under various conditions to produce the desired effect. While the exact nature of their action is not completely understood, the use of these chemical plasticizers or "peptizers" has become well known. It is with their manufacture and use that the present invention is concerned.

In the past, the available plasticizers have been objectionable from one or more of several reasons. Some are not suitably compatible with various elastomers. Some are toxic. Many operate either as skin irritants or skin sensitizers, resulting in objections from those who are obliged to handle the material. Others are characterized by very disagreeable odors which are often imparted to the finished articles. Many of the commonly used materials are subject to several such objections. As a result of these objectionable features, the use of plasticizers has tended to be limited in spite of the wide demand for materials for the purpose.

When the necessity arose for handling synthetic, rubber-like polymers, such, for example, as copolymers of butadiene and styrene or butadiene and acrylonitrile, operational difficulties became much more pronounced. These synthetic rubbers were found to be much more difficult to process than natural rubber. Therefore, the demand for effective plasticizers or "peptizers" which are not subject to the objectionable properties of materials previously used was markedly increased.

In accordance with the present invention new and novel plasticizable and plasticized elastomeric compositions are provided. The plasticizer used is thiosalicylisopropyl amide of the formula

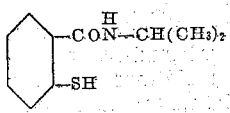

Preparation of typical members of this series of compounds may be illustrated by the following examples which are intended as illustrative only and not by way of limitation. All parts are by weight unless otherwise noted.

EXAMPLE 1

Preparation of dithiosalicyl chloride solution

About 60 parts of dithiosalicyclic acid are reacted in 175 parts of toluene with 84 parts of $PCl_5$. On completion of reaction the resultant $POCl_3$ and solvent are removed under reduced pressure, the residue taken up in boiling toluene and filtered. Where in the succeeding examples a toluene solution of dithiosalicylyl chloride is required, this solution is used. The chloride if desired is isolated by solvent removal.

EXAMPLE 2

A solution of dithiosalicyl chloride, obtained as in Example 1 from 30 parts of dithiosalicylic acid, was slowly added, with cooling and stirring to 35 parts of isopropylamine in 175 parts of toluene, a condenser being used to prevent escape of the isopropylamine, stirring being continued some time after the exothermic reaction subsided. The product, dithiosalicylisopropylamide, was separated and on recrystallization appeared as white needles melting at 233°–236° C. (uncorrected).

20 parts of this product was reduced with zinc in glacial acetic acid and the product, thiosalicylisopropylamide of the apparent formula

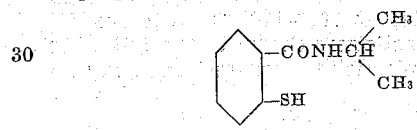

was separated. On recrystallization from 50% aqueous ethanol the product melted at 97°–101° C., and exhibited a nitrogen content of 7.10% as against calculated 7.18%.

As was noted above this compound possesses a marked utility as a plasticizer for natural and synthetic elastomers. Its effective use may be obtained through any conventional procedure at temperatures above about 70° C. whether using open mills, a Banbury mixer or the like or in oven treating. In milling operations the plasticizer may be directly incorporated at mill temperatures. For oven plasticizing it is usually best to incorporate the plasticizer at temperatures somewhat below 100° C. and plasticize subsequently at somewhat higher temperatures.

EXAMPLE 3

For purposes of comparison a sample of natural rubber was divided into two 300 gram portions, each of which was milled for 8 minutes at 100°–110° C. on a 6"x12" mill with the amounts of various plasticizers shown in the following Table I. The relative plasticities of the resultant compositions as shown by the Williams "Y" value are also shown.

*Table I*

| | | |
|---|---|---|
| Natural Rubber | 100 | 100 |
| Thiosalicylisopropylamide | | .0833 |
| Plasticity Tests: | | |
| Williams 3 Min. "Y" at 100° C.—Mils | 130 | 98 |
| 1 Minute Recovery at 100° C.—Mils | 16 | 11 |

That the thiosalicylisopropylamides should have this markedly useful plasticizing property is highly surprising. The relative inactivity of thiosalicylic acid is well known as shown in U. S. Patent 2,064,580. It was this inactivity which led to the defining of the aromatic mercaptans which are preferable for use as plasticizers as those of the type R—SH "in which R represents an aryl radical such as phenyl, tolyl, biphenyl, naphthyl, methylnaphthyl, or a higher aromatic nucleus in which the sole substituents consist of carbon and hydrogen such as alkyl and aralkyl radicals." Such a definition, which has been widely accepted, clearly excludes the thiosalicylamides of the present invention. Obviously the latter contain a substituent which is not "solely carbon and hydrogen."

Further, those aromatic mercaptans which in accordance with the above noted prior art definition constitute preferred plasticizers are physiologically objectionable. Not only are they more toxic and irritating than is desirable in a commercial plasticizer, they are further objectionable in the odor they possess or impart to the finished rubber goods. The thiosalicylisopropyl amide of the present invention is only free from this objection but is equally or more effective as a plasticizer than the better of the aromatic mercaptans of the prior art. This is well illustrated in the following example in which thiobetanaphthol, one of the best of such mercaptans, is directly compared with the present invention.

EXAMPLE 4

An additional sample of natural rubber was again divided into 300 gm. samples and milled for eight minutes at 100°–110° C. in a 6"x12" mill with the plasticizers shown in the following Table II. The plasticity measurements are also shown.

*Table II*

| | | | |
|---|---|---|---|
| Natural Rubber | 100 | 100 | 100 |
| Thiobetanaphthol | | .0833 | |
| Thiosalicylisopropylamide | | | .0833 |
| Plasticity Tests: | | | |
| Williams 3 Min. "Y" at 100° C.—Mils | 135 | 111 | 100 |
| 1 Min. Recovery at 100° C.—Mils | 14 | 8 | 9 |

EXAMPLE 5

Samples of GR–I, an isobutylene-diolefin (isoprene) copolymer type of synthetic elastomer composition were treated for ten minutes at 115° C. on a 6"x12" mill, with and without plasticizer. Illustrative results are shown in the following Table III.

*Table III*

| | | |
|---|---|---|
| GR-I (Butyl Rubber) | 100 | 100 |
| Thiosalicylisopropylamide | | 0.4 |
| Plasticity Tests: | | |
| Williams 3 Min. "Y" at 100° C.—Mils | 93 | 70 |
| 1 Min. Recovery at 100° C.—Mils | 6 | 4 |

EXAMPLE 6

Another sample of GR–S, a butadiene-styrene copolymer type of synthetic elastomer was divided into two portions and treated for six minutes in a Banbury mixer with jacket and rotor temperatures of 307° F. and 212° F. respectively.

The results are shown in the following Table IV.

*Table IV*

| | | |
|---|---|---|
| GR-S | 100 | 100 |
| Thiosalicylisopropylamide | | 0.4 |
| Plasticity Tests: | | |
| Williams 3 Min. "Y" at 100° C.—Mils | 120 | 88 |
| 1 Min. Recovery at 100° C.—Mils | 46 | 24 |

In general in using the plasticizer of the present invention the amount required will vary somewhat with the elastomer to be treated. It also depends on whether or not the thiosalicylisopropylamide is used per se or as one of its salts. A number of the latter are readily used as effectively as the free amide. These include, for example, both organic amine salts and salts of bimetallic metals, the zinc salts being particularly useful with a number of synthetic elastomer compositions.

On the other hand, these variations are relatively small as compared with the amount required for different types of rubber. Natural rubber compositions, for example, often may be satisfactorily treated with as little as 0.01–0.03% by weight and seldom require more than about 2.0%. By comparison, synthetic elastomers of the butadiene-acrylonitrile type may require from about 1.0 to 5.0% or more whereas in elastomers of the GR–S type usually from about 0.05 to .5 is effective and more than about 3.0 is seldom required.

Effective plasticizing action is found with substantially any of the elastoprenes such, for example, as natural rubber; polymers of butadiene and substituted butadienes; copolymers of these and other conjugated diolefines such as isobutylene with materials copolymerizable therewith having a single olefinic linkage such as styrene, substituted styrenes, isoprene and acrylonitrile; and chloroprene polymers.

We claim:

1. A method of increasing the plasticity of elastomeric compositions which comprises disseminating in a vulcanizable elastoprene selected from the group consisting of natural rubber, rubber-like polymers of conjugated diolefines and copolymers of a conjugated diolefine and a compound copolymerizable therewith containing a single olefinic linkage containing 0.01-5.0% by weight of the elastoprene of a plasticizing agent comprising a compound selected from the group consisting of N-isopropyl thiosalicylamide and the organic amine and zinc salts thereof, and subjecting the mixture to a temperature above 70° C. for a sufficient time to produce the desired plasticity.

2. A composition comprising sulfur, a vulcanizable elastoprene selected from the group consisting of natural rubber, rubber-like polymers of conjugated diolefines and copolymers of a conjugated diolefine and a compound copolymerizable therewith containing a single olefinic linkage, having uniformly disseminated therein 0.01-5.0% by weight of the elastoprene of a plasticizing agent comprising a compound selected from the group consisting of N-isopropyl thiosalicylamide and the organic amine and zinc salts thereof.

3. A vulcanizate obtained by vulcanizing a composition comprising sulfur, an elastoprene selected from the group consisting of natural rubber, rubber-like polymers of diolefine and conjugated copolymers of a conjugated diolefine and a compound copolymerizable therewith containing a single olefinic linkage, having uniformly disseminated therein 0.01–5.0% by weight of the elastoprene of a plasticizing agent comprising a compound selected from the group consisting of N-isopropyl thiosalicylamide and the organic amine and zinc salts thereof.

EDWIN O. HOOK.
ELMER W. COOK.

REFERENCES CITED

The following references are of record in the file of this patent:

UNITED STATES PATENTS

| Number | Name | Date |
|---|---|---|
| 2,389,489 | Dean et al. | Nov. 20, 1945 |
| 2,460,580 | Huber | Feb. 1, 1949 |

FOREIGN PATENTS

| Number | Country | Date |
|---|---|---|
| 542,645 | Great Britain | Jan. 21, 1942 |

OTHER REFERENCES

Vanderbilt Rubber Handbook, 1948, pages 389 and 393.

Ind. and Eng. Chem., vol. 39, pp. 94 and 97, January 1947.